March 19, 1968 — P. J. WEAVER — 3,373,801

TEMPERATURE REGULATION OF TRACER VALVES

Filed Dec. 10, 1965

INVENTOR.
PAUL J. WEAVER
BY
ATTORNEYS.

United States Patent Office 3,373,801
Patented Mar. 19, 1968

3,373,801
TEMPERATURE REGULATION OF
TRACER VALVES
Paul J. Weaver, Pasadena, Calif., assignor to True-Trace Corporation, El Monte, Calif., a corporation of Connecticut
Filed Dec. 10, 1965, Ser. No. 512,879
7 Claims. (Cl. 165—40)

ABSTRACT OF THE DISCLOSURE

A tracer valve including a spool passage having grooves and ports which control the flow of hydraulic fluid from a power supply to motors and exhaust the fluid to a supply. A reservoir collects the hydraulic fluid and includes temperature modifying means to maintain the temperature of the fluid discharged from the reservoir above ambient.

This invention relates to tracer valves for controlling machine tools.

Tracer valves of the class whose members include a body having an interior spool passage with an axis, and an axially shiftable spool within said spool passage are well known. Examples of these are to be found in United States Patents to Rosebrook Nos. 2,753,145 and 2,835,466.

The spool and the interior wall of the spool passage customarily have grooves and ports which control flow of pressurized hydraulic fluid from a power supply to motors, and then return the exhaust fluid to a supply. In turn, the position of the spool in the passage, which position is the source of the primary control signal, is determined by the tilting or other displacement of a stylus which itself follows a pattern or template, and serves to position the spool within the passage. The flow of fluid passed by the valve is a function of spool displacement, as well as the peripheral length of gap around the spool. It is evident that changes in the physical characteristics of the valve will have an effect on the part manufactured by the valve, and this is true both from part to part, and from region to region of the same part.

It is an object of this invention to remove one appreciable variable effect from tracer valves, and thereby increase their stability. By increasing their stability, there results an increase in the quality of the parts made on the machines controlled by them.

This invention comprises the combination of a tracer valve of the above class, with a fluid-flow conduit in heat transfer relationship to the said tracer valve. A fluid supply discharges into this conduit, and means is provided for maintaining temperature of the fluid discharged from the fluid supply above ambient.

According to a preferred but optional feature of the invention, the same fluid supply which supplies the fluid-flow conduit also supplies the tracer valve, and restrictor means is provided in the said fluid-flow conduit to restrict the flow therethrough.

According to still another preferred but optional feature of the invention, the fluid-flow conduit is provided within the body of the tracer valve.

Figure 1:
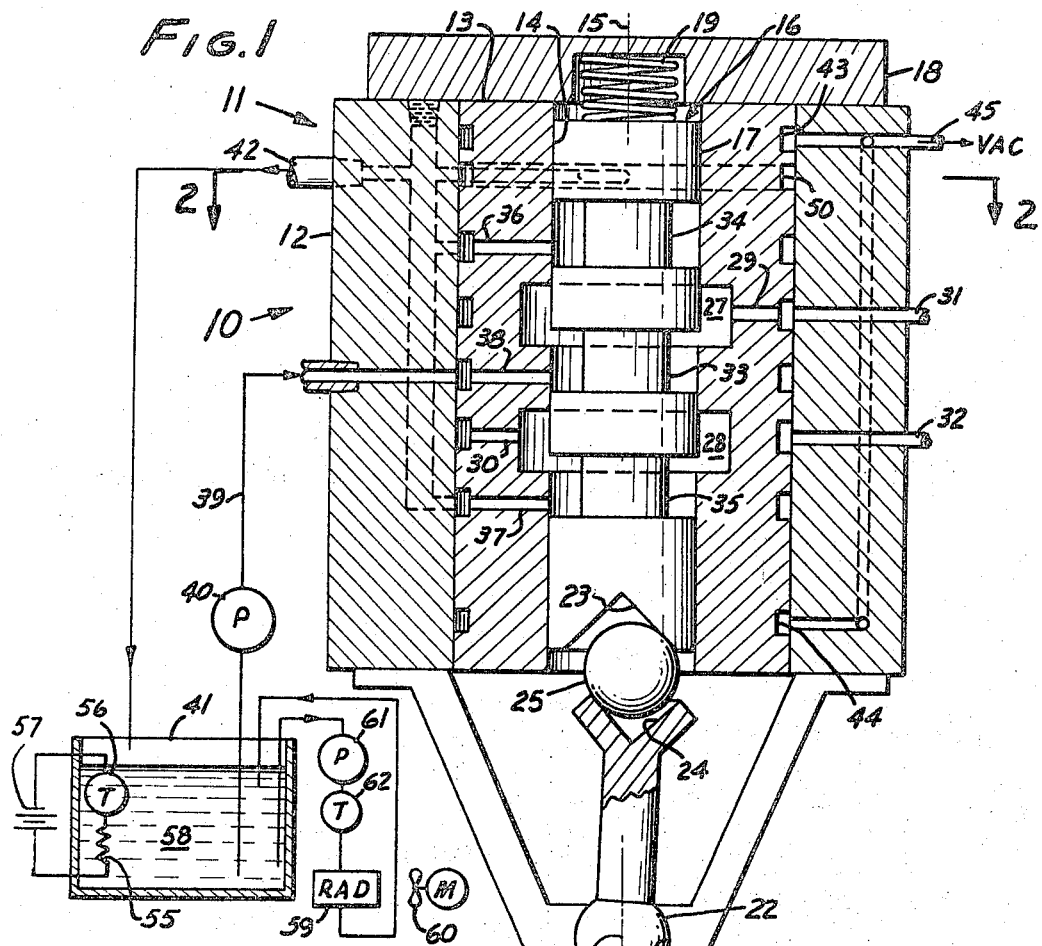
Figure 2:
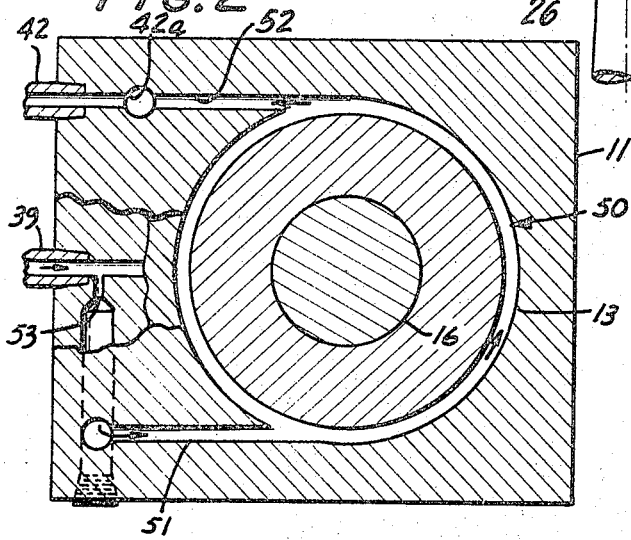

The above and other features of this invention will be fully understood from the following detailed description and the accompanying drawings in which:

FIG. 1 is a side elevation, partly in cutaway cross-section and partly in schematic notation, showing the presently preferred embodiment of the invention; and FIG. 2 is a cross-section taken principally at line 2—2 of FIG. 1.

FIG. 1 illustrates a tracer valve 10 according to the invention which may be utilized for the same types of control as those shown in United States Patents to Rosebrook, Nos. 2,753,145 and 2,835,466, and to Weaver, No. 3,055,393. Such a tracer valve customarily includes a body 11 which may comprise a jacket 12 and an internal sleeve 13. The sleeve includes an internal spool passage 14 with an axis 15, this passage generally being cylindrical.

Within this passage there is disposed a spool 16 having an exterior peripheral surface 17 which matches that of the internal spool passage. This spool makes a fluid-sealing fit with the wall of passage 14 and is adapted to slide axially therein. The body also includes a cap 18 to restrain a bias spring 19 which bears against the top of the spool so as to bias it downwardly against a stylus 20. The stylus is mounted in a socket 21 by a ball-like member 22 which is incorporated in the length of the stylus. Opposed sockets 23, 24 on the spool and the end of the stylus respectively trap a ball 25 between them, and then tilting of the stylus around the center 26 of ball-like member 22 causes upward movement of the spool from a lower position. The lower position is assumed when the stylus is vertical in FIG. 1. The function of this socket is fully set forth in Rosebrook Patent No. 2,753,145. Full details of this portion of the device are not given here because they are not of importance to the invention.

The wall of the internal spool passage includes motor supply grooves 27, 28, which are connected through passages 29, 30, respectively, to motor supply ports 31, 32. A pressure groove 33 and a pair of exhaust grooves 34, 35 are formed in the spool. The sleeve is pierced by exhaust ports 36, 37 and pressure port 38. Pressure port 38 is connected by conduit 39 through pump 40 to a reservoir 41. Exhaust ports 36 and 37 are connected to an exhaust conduit 42 which discharges to the reservoir. A passage 42a joins exhaust groove 37 to exhaust conduit 42. Scavenging grooves 43, 44 are connected to a vacuum line 45. The pressure port opens into the pressure groove. The exhaust ports open into the exhaust grooves. The motor supply grooves are adapted to be overlapped by the pressure and one of the exhaust grooves when shifted from a central, symmetrical position.

A "fluid flow conduit" 50 (FIG. 2) is formed peripherally between the jacket and the sleeve for the circulation of fluid to maintain a given temperature condition in the tracer valve. It may conveniently be formed, as are some of the other grooves, by machining it in the outer surface of the sleeve which is pressed fitted into the jacket.

The flow conduit includes a supply line 51 and exhaust line 52. The supply line includes a restrictor 53 where it branches off of pressure conduit 39. This restrictor prevents the flow conduit 50 from causing an excessive drop in pressure in the principal supply line which is common to both the fluid supply system for tracer valve operation and for maintenance of temperature.

It will be noted that FIG. 2 includes sections taken at two elevations—one at the lower inlet level, and the other at the upper exhaust level. It has been found that one peripheral groove of this type for circulation of temperature-controlled fluid is sufficient to keep the valve at a desired temperature. The groove in this case is groove 52 at the upper level in FIG. 2. Alternatively, the valve could be jacketed, or a larger number of grooves of this kind could be formed at any desired elevation and at any desired number of these elevations. A means is thereby provided for maintaining the temperaure of the fluid supplied to the system at any desired level. It will be noted that flow through much of the valve, all from the same temperature-regulated source, is intermittent. For example, there is flow through any of the grooves associated with the spool only when the spool is shifted off center as is shown in FIG. 1. However, fluid flow through conduit 50 is continuous, which provides steady flow to keep the temperature stable.

In order to maintain the value at an even level, it is necessary that this temperature be above ambient. For this reason a heater 55, under control of a thermostat 56, is placed in the reservoir. An electrical power supply 57 such as a battery supplies this heater attempts to maintain a desired temperature level in fluid 58. In addition to heating, it may be necessary to cool the fluid. For this purpose a conventional radiator 59 is provided across which a fan 60 circulates cool air. A pump 61 withdraws fluid from the radiator, sending it through a thermostat 62 which controls the actual flow through the radiator, and returns the cooled fluid to the reservoir.

It has been found that it is best to keep the reservoir between about 100° F. and 110° F., or approximately 30° F. above ambient temperature in the usual machine shop. The valve's temperature can and should be controlled to about ±1° F. of a selected temperature. This differential of the fluid from ambient is above that of expectable and predictable local effects such as variations of temperature of the room during the day, or of transient cooling effects of the surroundings. By having a sufficiently large differential, the local effects are overcome by the control exerted by the fluid supply. It has been found that about ½ gal. per minute through fluid flow conduit 50 can effectively keep a conventional tracer valve at a consistent temperature, and thereby improve the accuracy of its control.

This invention is not to be limited by the embodiment shown in the drawings and described in the description which is given by way of example and not of limitation, but only in accordance with the scope of the appended claims.

I claim:

1. In combination: a tracer valve of the class which includes a stylus adapted to contact a pattern or template, a body having an interior spool passage with an axis, and an axially shiftable spool within said spool passage, movable in the passage as a consequence of stylus motion, the wall of the passage and the periphery of the spool being suitably grooved and ported to control fluid flow through the valve as a function of the motion of the stylus in response to contact with a pattern or template; a fluid flow conduit in heat transfer relationship with the said tracer valve; a fluid supply discharging into said conduit; and means for maintaining the temperature of the fluid discharged from said fluid supply above ambient thereby to maintain the tracer valve substantially at a predetermined temperature above ambient.

2. A combination according to claim 1 in which the said fluid supply also supplies fluid to the said grooving and porting for control by the tracer valve; and in which a restriction is placed in said fluid flow conduit to restrict the rate of fluid flow therethrough.

3. A combination according to claim 1 in which the said conduit is disposed within the tracer valve.

4. A combination according ot claim 3 in which the said fluid supply also supplies fluid to the said grooving and porting for control by the tracer valve; and in which a restriction is placed in said fluid flow conduit to restrict the rate of fluid flow therethrough.

5. A combination according to claim 1 in which the means for maintaining the temperature comprises a reservoir for fluid to be supplied; a heater in said reservoir for heating its contents; and a thermostat means responsive to the temperature of said fluid and effective to control the heater.

6. A combination according to claim 1 in which the means for maintaining the temperature comprises a reservoir for fluid to be supplied; a radiator; a pump connected to the reservoir and to the radiator; and a thermostat means responsive to the temperature of said fluid and effective to control the quantity of fluid which flows through the radiator from the reservoir through the pump, and returns to the reservoir.

7. A combination according to claim 6 in which the means for maintaining the temperature additionally comprises a heater in said reservoir.

References Cited

UNITED STATES PATENTS

| 2,293,854 | 8/1942 | Sauzedde | 60—54.6 |
| 2,352,187 | 6/1944 | Ellinwood | 60—54.5 |
| 2,900,995 | 8/1959 | Dickerson et al. | 137—340 |
| 3,024,808 | 3/1962 | Woodruff | 91—37 X |

FOREIGN PATENTS

| 872,763 | 2/1942 | France. |

EDWARD J. MICHAEL, *Primary Examiner.*

ROBERT A. O'LEARY, *Examiner.*

M. A. ANTONAKAS, *Assistant Examiner.*